United States Patent

Miller

(10) Patent No.: US 9,445,159 B2
(45) Date of Patent: Sep. 13, 2016

(54) EXTENDED RECORDING TIME APPARATUS, SYSTEMS, AND METHODS

(75) Inventor: Kerry Philip Miller, El Segundo, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 1356 days.

(21) Appl. No.: 11/958,337

(22) Filed: Dec. 17, 2007

(65) Prior Publication Data

US 2009/0158357 A1     Jun. 18, 2009

(51) Int. Cl.
| | |
|---|---|
| H04N 21/4147 | (2011.01) |
| H04N 21/433 | (2011.01) |
| H04N 21/436 | (2011.01) |
| H04N 21/442 | (2011.01) |
| H04N 21/472 | (2011.01) |
| H04N 21/482 | (2011.01) |
| H04N 5/445 | (2011.01) |

(52) U.S. Cl.
CPC ........ *H04N 21/482* (2013.01); *H04N 5/44543* (2013.01); *H04N 21/4147* (2013.01); *H04N 21/4334* (2013.01); *H04N 21/43622* (2013.01); *H04N 21/44222* (2013.01); *H04N 21/47214* (2013.01)

(58) Field of Classification Search
CPC ..................... H04N 21/4147; H04N 21/4334; H04N 21/482; H04N 21/44222; H04N 21/47214; H04N 21/43622; H04N 5/44543
USPC ........................................ 725/58, 61; 386/46
See application file for complete search history.

(56) References Cited

U.S. PATENT DOCUMENTS

| | | | | |
|---|---|---|---|---|
| 6,311,011 | B1 * | 10/2001 | Kuroda | 386/46 |
| 7,356,246 | B1 * | 4/2008 | Kobb | 725/58 |
| 7,369,744 | B2 * | 5/2008 | Tobiishi | 386/45 |
| 7,581,238 | B1 * | 8/2009 | Taylor et al. | 725/58 |
| 2002/0054068 | A1 * | 5/2002 | Ellis et al. | 725/153 |
| 2002/0181935 | A1 * | 12/2002 | Otana | 386/83 |
| 2003/0072559 | A1 * | 4/2003 | Van Haver | 725/58 |
| 2003/0093790 | A1 * | 5/2003 | Logan | H04N 21/44222 725/38 |
| 2003/0206719 | A1 * | 11/2003 | Bumgardner et al. | 725/58 |
| 2004/0078817 | A1 * | 4/2004 | Horowitz et al. | 725/58 |
| 2006/0168625 | A1 * | 7/2006 | Gildred | 725/58 |
| 2006/0179462 | A1 * | 8/2006 | Willame et al. | 725/90 |
| 2006/0222325 | A1 * | 10/2006 | Ellis | 386/83 |
| 2007/0286582 | A1 * | 12/2007 | Dolph | 386/112 |

OTHER PUBLICATIONS

DVR User's Guide—EchoStar Technologies Corporation, Copyright 2003, pp. 69-85.

* cited by examiner

*Primary Examiner* — Randy Flynn
(74) *Attorney, Agent, or Firm* — Seed IP Law Group PLLC

(57) ABSTRACT

An embodiment for recording a channel that is communicating a program of interest identifies a selected program for recording as a program of interest based upon a characteristic of the selected program, the characteristic of the selected program corresponding to at least one characteristic associated with the program of interest, records an advance period corresponding to a period before a beginning of the program of interest, and records a following period corresponding to a period after a conclusion of the program of interest.

30 Claims, 6 Drawing Sheets

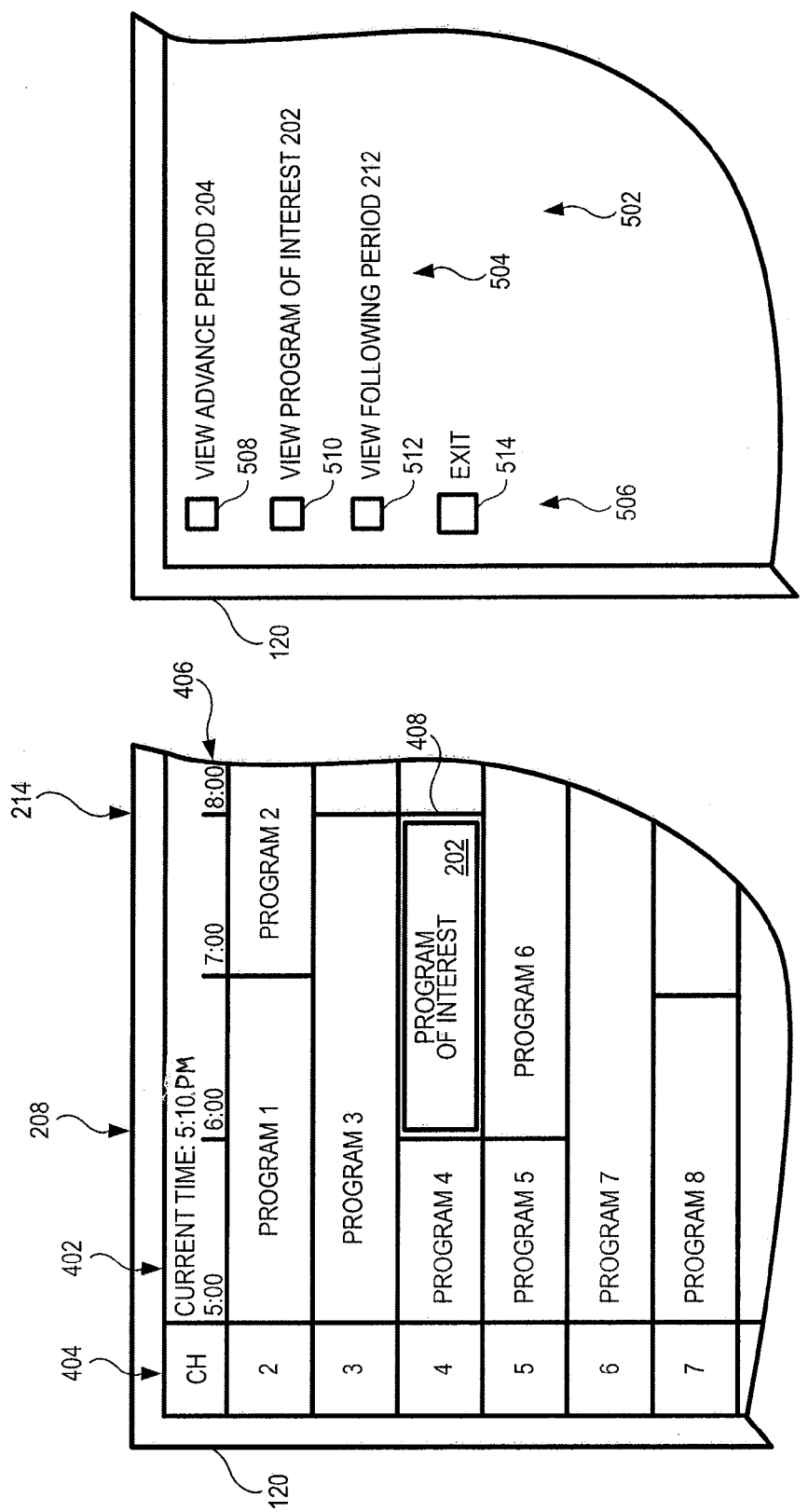

EXTENDED RECORDING TIME APPARATUS, SYSTEMS, AND METHODS

TECHNICAL FIELD

The technical field relates to systems and methods for audio/video/data content providers and, more particularly, to apparatus, systems and methods for extended recording time of a channel of a program.

BRIEF SUMMARY

Apparatus, systems and methods for recording a channel that is communicating a program of interest are disclosed. According to one embodiment, a process comprises identifying a selected program for recording as a program of interest based upon a characteristic of the selected program, the characteristic of the selected program corresponding to at least one characteristic associated with the program of interest; recording an advance period, the advance period corresponding to a period before a beginning of the program of interest; and recording a following period, the following period corresponding to a period after a conclusion of the program of interest.

A system embodiment comprises a receiving device operable to receive a program of interest selected for recording, and a processor operable to compare at least one characteristic of a program selected for recording with a plurality of program characteristics, and in response to the characteristic of the program matching one of the plurality of database characteristics, is operable to control recording of at least an advance period that precedes a scheduled start time of the program of interest and a following period that follows a scheduled end time of the program of interest.

BRIEF DESCRIPTION OF THE SEVERAL VIEWS OF THE DRAWINGS

The components in the drawings are not necessarily to scale relative to each other. Like reference numerals designate corresponding parts throughout the several views.

FIG. 4 is an exemplary partial screen shot illustrating a hypothetical electronic programming guide displayed on a TV.

FIG. 5 is an exemplary partial screen shot illustrating a hypothetical extended time recorder notification message that is displayed on the TV.

FIG. 6 is a block diagram of an extended time recorder embodiment implemented in a user device, such as a DVR or the like.

DETAILED DESCRIPTION

A. Communication System Overview

Figure 1:
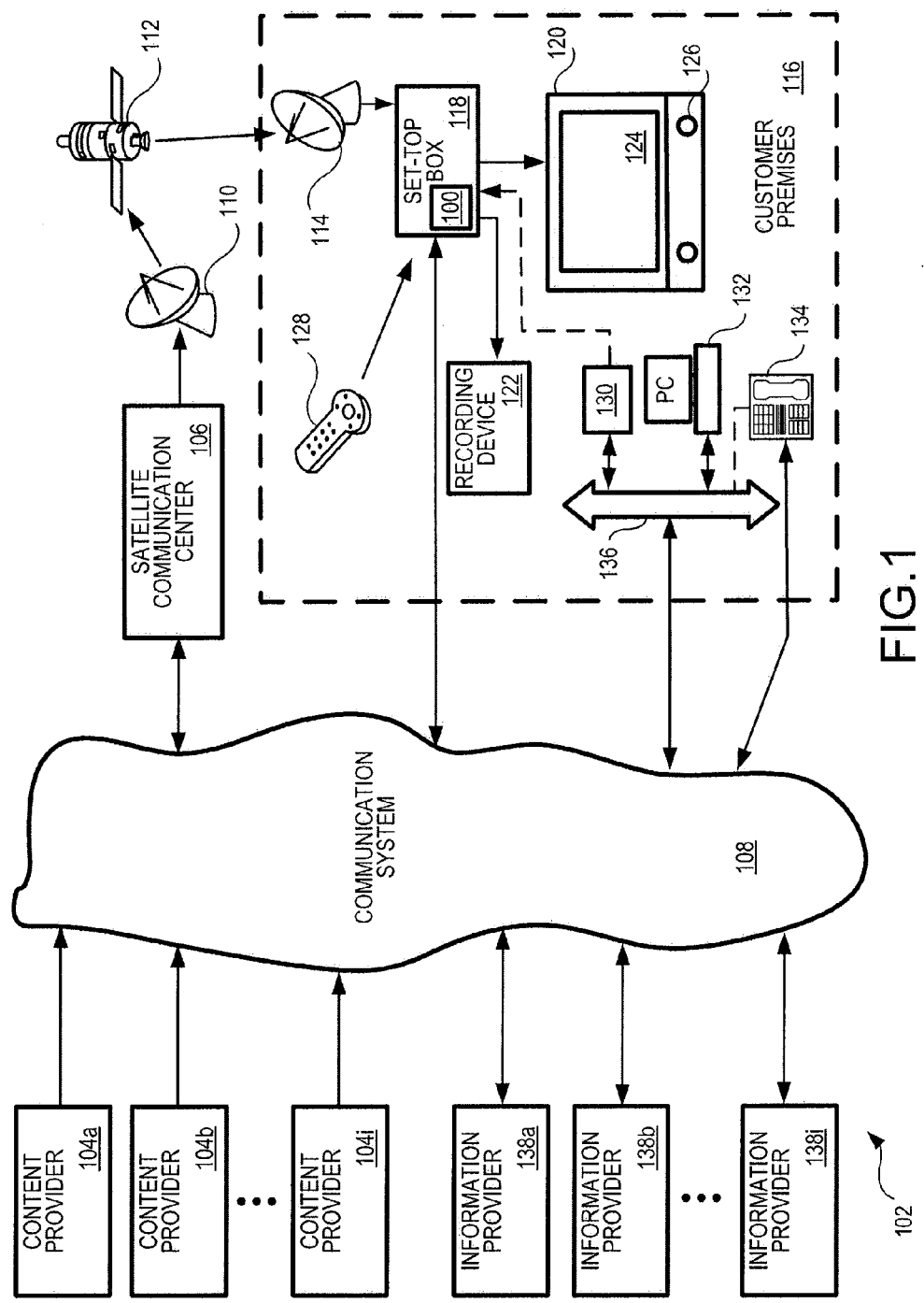
FIG. 1 is a block diagram illustrating an exemplary communication system in which embodiments of the extended time recorder may be implemented.

FIG. 1 is an overview block diagram illustrating an exemplary communication system 102 in which embodiments of the extended time recorder 100 may be implemented. It is to be appreciated that FIG. 1 is just one example of a communications system and that the various embodiments discussed herein are not limited to such exemplary system. Communication system 102 can include a variety of communication systems and can use a variety of communication media including, but not limited to, satellite wireless media.

Television service providers provide their customers a multitude of audio/video and/or data programming (hereafter, collectively and/or exclusively "programming"). Such programming is often provided by use of a receiving device 118 (FIG. 1) communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other devices, such as the exemplary recording device 122.

Examples of a presentation device 120 include, but are not limited to, a television (TV), a personal computer (PC), a sound system receiver, a digital video recorder (DVR), a compact disk (CD) device, game system, or the like. Presentation devices 120 employ a display, one or more speakers, or other output devices to communicate video and/or audio content to a user. In many implementations, one or more presentation devices 120 reside in or near a customer's premises 116 and are communicatively coupled, directly or indirectly, to the receiving device 118.

Figure 2:
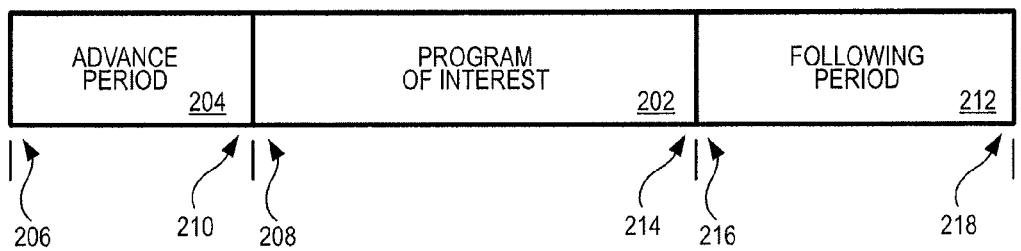
FIG. 2 is an overview illustrating the recording times associated with recording a program of interest made by embodiments of the extended time recorder.

Program scheduling information may be provided interactively and on a real-time basis to a user by displaying an electronic programming guide (EPG) on the presentation device 120, which indicates the scheduled start time, the scheduled end time, and other information, of a program of interest 202 (FIG. 2). When the presentation device 120 is coupled to a recording device 122, described in greater detail below, or if the presentation device 120 itself has program recording capability, a user may select a scheduled program of interest 202 for recording via the EPG, typically by selecting a highlighted area on the EPG displaying the above described information pertaining to the program of interest 202. Alternatively, the user may select a scheduled program of interest 202 for recording via the recording device 122 by specifying a starting record time, an ending record time (or period of time for recording), and/or a selected channel or the like.

However, not all programs of interest 202 begin and finish precisely at their scheduled start and scheduled end times.

And, there may be related programming that may also be of interest available before and/or after the scheduled program of interest 202.

For example, recording specific Olympic game events may be difficult, even if the events are scheduled beforehand. And, the program provider may provide related information of interest, such as athlete profiles or event histories, prior to or after the Olympic game event at unscheduled times. As another example, professional sport events such as hockey, football, soccer, baseball, basketball, bowling, golf, and/or tennis will often have pre-game or post-game programming available, especially during championship playoff events.

In other situations, the actual program start time and end times may be different from the scheduled start time and end time. For example, there may be a delay in the start of a broadcasted sports event, or even a temporary delay during the event itself, due to inclement weather. Further, the end of the sports event may be delayed, for example, during a playoff game where one or more overtime periods are required to complete the competition. As another example, a program of interest 202 may be delayed by a prior delayed broadcasted program, or may be delayed by an unscheduled program interruption (such as, but not limited to, an unscheduled speech by an elected politician or emergency broadcast that interrupts the current program of interest or an earlier broadcasted program).

Accordingly, the various embodiments disclosed herein, whether used singularly or in combination, facilitate the recording of programming received by one or more receiving devices 118 for later presentation to one or more presentation devices 120. Desirably, but not necessarily, the various embodiments record programming before and/or after a program of interest 202 so that more programming is available for subsequent presentation. The programming may be stored or recorded in any suitable location and/or format, and/or may be recorded by any suitable device, as described herein.

Recording, storing, saving, or writing, received programs (or portions thereof) into or onto a suitable memory medium is collectively referred to herein as "recording" or the like. Thus, recording may refer to saving the program into a suitable memory, such as a hard drive system or the like. Recording may also refer to the recording of the program to a portable media, such as a magnetic tape, optical disc, smart card, or the like.

A plurality of content providers 104a-104i provide program content, such as television content or audio content, to a distributor, such as the program distributor 106. Exemplary content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, cable systems, fiber optic systems, microwave systems, asynchronous transfer mode (ATM) systems, frame relay systems, digital subscriber loop (DSL) systems, radio frequency (RF) systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

The received program content is converted by one or more devices (not shown) as necessary at the program distributor 106 into a suitable signal that is communicated (i.e.; "uplinked") by one or more antennas 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antennae 114 are operable to receive signals from a single satellite 112. Other types of receiver antennae 114 are operable to receive signals from multiple satellites 112.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. Receiving device 118 is a conversion device that converts, also referred to as formatting, the received signal from antenna 114 into a signal suitable for communication to a presentation device 120 and/or a recording device 122. Often, the receiver antenna 114 is of a parabolic shape that may be mounted on the side or roof of a structure. Other antenna configurations can include, but are not limited to, phased arrays, wands, or other dishes. Other antenna shapes and configurations may be utilized without deviating from the invention.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television (TV) or the like, and/or to a recording device 122. It is to be appreciated that presentation device 120 may be any suitable device operable to present a program having video information and/or audio information.

Recording device 122 may be any suitable device that is operable to receive a signal from the receiving device 118, another endpoint device, or from other devices external to the customer premises 116, and save, store, record or the like the information from the received signal. Additional non-limiting examples of recording device 122 include optical media recorders, such as a compact disk (CD) recorder, a digital versatile disc or digital video disc (DVD) recorder, a digital video recorder (DVR), or a personal video recorder (PVR), magnetic tape type recorders, personal computers (PCs) and/or associated periphery devices, personal device assistants, cellular phones, and other devices having a memory medium operable to save a received program. Further, the recording device 122 is illustrated as residing outside of the receiving device 118. In other embodiments, the recording device 122 may be a component, system or device within the receiving device 118. In other embodiments, the recording device 122 may be a component, system or device within the presentation device 120, or even in another multi-function device. All such embodiments are intended to be included within the scope of this disclosure.

Interface between the receiving device 118 and a user (not shown) may be provided by a hand-held remote device 128. Remote 128 typically communicates with the receiving device 118 using a suitable wired or wireless medium, such as infrared (IR), RF, or the like. Other devices (not shown) may also be communicatively coupled to the receiving device 118 so as to provide user instructions. Non-limiting examples include a game device controller, mouse, keyboard, etc.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

It is appreciated that it is not practical to list or describe herein all of the possible types of receiving devices 118, presentation devices 120, user devices 122, remotes 128, intermediary devices 130, or their equivalents. Further, it is appreciated that it is not practical to list or describe herein all of the possible types of interconnectivity and/or forms of media by which a receiving device 118 may receive program content. However, all such possible devices, types of interconnectivity, and media forms are intended to be included within the scope of this disclosure. Examples of such devices, types of interconnectivity, and/or media forms are further described in greater detail hereinbelow.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network (LAN) system, or the like, One or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other. Alternatively, or additionally, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

The above description of the communication system 102 and the customer premises 116, and the various devices therein, is intended as a broad, non-limiting overview of an exemplary environment in which various embodiments of the extended time recorder 100 may be implemented in. The communication system 102, and the various devices therein, may contain other devices, systems and/or media not specifically described herein.

B. Extended Time Recorder System Overview

FIG. 2 is an overview illustrating the recording times associated with recording a program of interest 202 made by embodiments of the extended time recorder 100. A non-limiting example of a program of interest 202 is a video program (with audio) that is presented to a user on presentation device 120 (FIG. 1). The program of interest 202 corresponds to a stream of programming, having video, audio, and/or data. For example, but not limited to, if the presentation device 120 is a television, the program may be communicated over a designated or selected channel to the television.

Initially, a user selects the program 202 to be recorded. Embodiments of the extended time recorder 100 identify the selected program for recording as a program of interest 202 based upon one or more characteristic features corresponding to the types of programming for which an advance period 204 and a following period 212 will be recorded, as described in greater detail below.

In response to identifying the selected program for recording as a program of interest 202, the extended time recorder 100 automatically records for some period of time prior to the scheduled start time of the program of interest 202, referred to herein as the advance period 204. Further, the extended time recorder 100 records for another period of time after the scheduled end time of the program of interest 202, referred to herein as the following period 212. Thus, if a user wishes to record a program of interest 202 that corresponds to a predefined characteristic (such as a sporting event), embodiments of the extended time recorder 100 may automatically record before and after the program of interest 202. The predefined category, criteria, or the like, is described in greater detail hereinbelow.

At a later time, the user causes the recording device 122 to retrieve the recorded program of interest 202 from its storage medium for presentation on presentation device 120. Embodiments of the extended time recorder 100 indicate to the user that the recordings before (advance period 204) and/or after (following period 212) the program of interest 202 are available for presentation. Thus, if the user wants to view the advance period 204 and/or the following period 212, these recordings are retrieved and presented to the user.

As noted above, embodiments of the extended time recorder 100 are operable to record for some period of time prior to the scheduled start time of the program of interest 202, referred to hereinafter as an advance period 204. The recorded advance period 204 will have information of interest that was broadcasted prior to the start of program of interest 202. For example, the above-described sports programming may comprise Olympic game events that may have related information of interest, such as athlete profiles or event histories, broadcasted prior to the Olympic game event at an unscheduled time. As another example, professional sporting events such as hockey, football, soccer, baseball, basketball, bowling, golf, and/or soccer will often have pre-game programming available, especially during championship playoff events. Accordingly, the recorded advance period 204 will have recorded this information of interest for later viewing at the option of the user.

Recording of the advance period 204 begins at a time 206 that precedes the scheduled start time 208 of the program of interest 202. Start time 208 corresponds to some period of time corresponding to the beginning of the program of interest 202. As will be described in greater detail below, the time 206 may be predefined by the embodiment, predefined by information in the program itself, or predefined by the content provider or the distributor. Alternatively, or additionally, time 206 may be defined by the user based upon a predefined period of time, or based upon a time specified by the user.

The advance period 204 is illustrated as concluding at time 210. Time 210 generally corresponds to the scheduled start time 208 of the program of interest 202. As will be described in greater detail below, time 210 may be predefined by the embodiment, predefined by information in the program itself, or predefined by the content provider or the distributor. Alternatively, or additionally, time 210 may be defined by the user based upon a predefined period of time, or based upon times specified by the user. In an embodiment that separately records the advance period 204, time 210 may be later or earlier than the scheduled start time 208 of the program of interest 202.

It is appreciated that the recording of the program of interest 202 continues, or is restarted, at or near the scheduled start time 208 of the program of interest 202. The transition between the recorded advance period 204 and the program of interest 202 may be seamless, such as when a single recording device 122 is storing the recorded advance period 204 and the program of interest 202. However, some embodiments may record the advance period 204 separately from the program of interest 202, and accordingly, the time 210 may be different from the scheduled start time 208 so as to result in a time gap in the recording or in an overlap in the recording. Thus, the advance period 204 may precede a scheduled start time of the program of interest 202.

Upon conclusion of the broadcasting of the program of interest 202 (and the attendant recording of the program of interest 202), embodiments of the extended time recorder 100 are operable to automatically record a following period 212. The recorded following period 212 will have information of interest that was broadcasted after the conclusion of the program of interest 202.

For example, the above-described Olympic game events may have related information of interest, such as athlete profiles or event histories, broadcasted after the Olympic game event at an unscheduled time or as separate programming. As another example, professional sporting events such as hockey, football, soccer, baseball, basketball, bowling, golf, and/or tennis will often have post-game programming or may have over-time periods of play, especially during championship playoff events. Or, the program may be extended or delayed for other reasons, such as by inclement weather or by unscheduled program interruptions. Accordingly, the recorded following period 212 will have included this subsequently broadcasted information of interest for later viewing at the option of the user.

Recording of the following period 212 generally begins at or after the scheduled end time 214 of program of interest 202. The following period 212 is illustrated as beginning at time 216, which corresponds to the scheduled end time 214. The following period 212 ends at time 218. In some embodiments, time 216 may correspond to some period of time different from the scheduled end time 214 of the program of interest 202.

It is appreciated that the recording of the following period 212 continues, or is restarted, at or near the scheduled end time 214 of the program of interest 202. The transition between the program of interest 202 and the recorded following period 212 may be seamless, such as when a single recording device 122 is recording the program of interest 202 and the following period 212. However, in some embodiments, time 216 may be different from the scheduled end time 214 of the program of interest 202. For example, some embodiments may record the following period 212 separately from the program of interest 202, and accordingly the start time 216 of the following period 212 may be different from the scheduled end time 214 of the program of interest 202 so as to result in a time gap in the channel recording or in an overlap in the channel recording. Thus, the following period 212 substantially follows a scheduled end time of the program of interest 202.

Times 216 and/or 218 may be predefined by an embodiment, predefined by information in the program itself, or predefined by the content provider or the distributor. Alternatively, or additionally, times 216 and/or 218 may be defined by the user based upon a predefined period of time, or based upon times specified by the user.

C. Exemplary Extended Time Recorder System Embodiment

Figure 3:
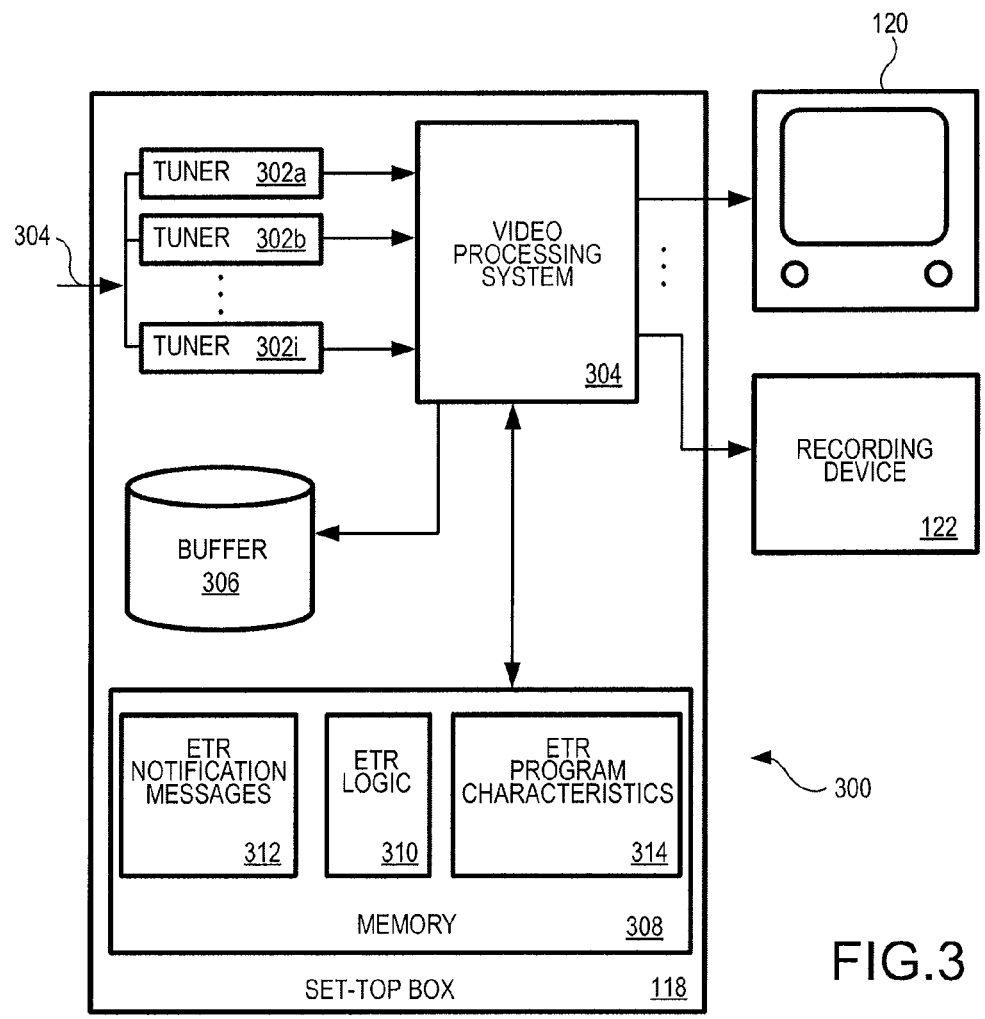
FIG. 3 is an overview block diagram illustrating an exemplary extended time recorder embodiment.

FIG. 3 is an overview block diagram illustrating an exemplary embodiment of an extended time recorder 100 implemented in receiving device 118. In this exemplary embodiment, a plurality of tuners 302a-302i receive programming information from the receiver antenna 114 to tune the received programming to a particular channel corresponding to the program of interest 202 (FIG. 2). Programming may be provided by any suitable communication media providing broadcasted programming content.

Video processing system 304 receives one or more programs from the tuners 302a-i, and further process the received programming into streams of video, audio, and/or other information for presentation on one or more presentation devices 120, and/or communication to one or more user devices 122, such as a DVR. Video processing system 304 may further perform a variety of functions during the processing of a program which is ultimately communicated to the presentation devices 120 or user devices 122. Non-limiting examples include decryption of secure programs, demodulation of information in the received programs, formatting the information in the output into a digital or analog signal, preparing an electronic programming guide (EPG), or providing various "trick" functionality that is displayed to the user in a selectable format. Other functions not described above may also be performed by the video processing system 304.

The extended time recorder 100 further includes a memory for recording programming, referred to as buffer 306. Buffer 306 may be a hard-drive memory system or other suitable memory system operable to store recorded program of interest 202, the advance period 204, the following period 212, and/or other programs.

Some embodiments record the advance period 204, the program of interest 202, and the following period 212 into a memory media, such as buffer 306 or a remote recording device 122. In some embodiments, the advance period 204, the program of interest 202, and the following period 212 may be stored as a seamless recording with suitable markers to indicate the different portions of the seamless recording.

Alternatively, the advance period 204, the program of interest 202, and the following period 212 may be separately stored as separate recordings.

Other embodiments may only record the advance period 204 and the following period 212 into buffer 306. Here, the program of interest 202 would be recorded by an external recording device 122, such as a DVR, or even a separate memory medium, such as memory 308 or another memory media (not shown), in the set-top box 118. Thus, when the separately recorded program of interest 202 is retrieved from the external recording device 122 or another memory for play back, embodiments of the extended time recorder 100 indicate to the user the availability of the advance period 204 and the following period 212 for viewing. (For convenience, "play back" refers to the process of retrieving previously recorded, stored or saved program content from a memory medium and presenting the retrieved program content on a presentation device 120 or the like.

In other embodiments, an external recording device 122 may be controlled by the extended time recorder 100. Accordingly, the advance period 204, the program of interest 202, and/or the following period 212 are externally stored in recording device 122. For example, the extended time recorder 100 may be implemented in a DVR or the like. In yet other embodiments, buffer 306 may itself be an external device 122 under control of the extended time recorder 100.

The extended time recorder 100 may optionally include memory 308. Memory 308 may be any suitable memory system operable to store the extended time recorder (ETR) logic 310, the ETR Notification Messages 312, and the ETR program characteristics 314. Memory 308 may also optionally be used to store other suitable stored logic and/or information (not shown). In some embodiments, memory 308 may be a read only memory (ROM), or may be a suitable writable memory, such as, but not limited to, a random access memory (RAM) or the like. In other embodiments, the above-described buffer may be used for storing this information. The functionality of the ETR logic 310, the ETR Notification Messages 312, and the ETR program characteristics 314 will be described in greater detail hereinbelow.

FIG. 4 is an exemplary partial screen shot illustrating a hypothetical electronic programming guide (EPG) 400 displayed on presentation device 120. In this simplified illustrative example, a current time of "5:10 p.m." is indicated on the EPG 400 at 402. Channels 2-7 are indicated on the EPG 400 in a column at 404. The EPG 400 graphically indicates the scheduled programming from the current time period starting at 5:00 p.m. through 8:00 p.m., generally indicated at 406. It is appreciated that the EPG 400 may display scheduled programming over a longer period of time, even up to several hours in advance of the current time. Further, the EPG 400 may display available programming for more channels than the illustrated channels 2-7. That is, many more channels, and their attendant programs, may be displayed on an EPG 400 over a longer period of time than is illustrated in the exemplary partial screen shot of FIG. 4.

Continuing with the above hypothetical illustrative example, assume that a user wishes to record the program of interest 202, which is illustrated as beginning at 6:00 p.m. and ending at 8:00 p.m. on channel 4. Using remote 128 (FIG. 1), the user highlights the region 408 corresponding to the program of interest 202 (indicated by the bolded box around the program of interest 202). Any suitable system or method of displaying suitable highlighting or indicia to indicate a program of interest on an EPG 400 may be used by embodiments of the extended time recorder 100. Then, the user selects the indicated program of interest 202 by actuation of a selection key or the like on the remote 128 (FIG. 1) to indicate that the highlighted program is to be recorded by the extended time recorder 100.

Once the user's selection is communicated to the extended time recorder 100, the channel (here, channel 4), the scheduled start time (here 6:00 p.m.) and the scheduled end time (here 8:00 p.m.) of the program of interest 202 are known or determinable by the extended time recorder 100. Accordingly, when the identified channel (here, channel 4) is broadcasted and received by the extended time recorder 100, above-described advance period 204 begins to record at time 206 (FIG. 2), which is in advance of the start time of 6:00 p.m. Exemplary start record times 206 could be based on a predefined time such as fifteen minutes, a half hour, an hour, or any other suitable time. Start time 206 could be predefined or dynamically defined by the user.

Other embodiments may employ other apparatus and/or processes to a user to select a program of interest 202 for recording. That is, selection of a program of interest 202 may be implemented in other manners than by using the above-described EPG 400.

The program of interest 202 may be recorded within the receiving device 118 itself when recording device 122 is an internal component, system or device. In such embodiments that seamlessly record the advance period 204, the program of interest 202, and the following period 212, recording begins at time 206 and continues after time 210 so that the program of interest 202 is seamlessly recorded with the advance period 204. Recording of the program of interest 202 continues through the scheduled end time 214 such that the following period 212 is seamlessly recorded. Recording ends at time 218.

As noted above, the program of interest 202 may be separately recorded from the advance period 204 and/or the following period 212. The recordings may be in external recording devices 122. In such embodiments, recording of the advance period 204 continues to time 210. Then, recording stops. At time 216, recording of the following period 212 begins. Recording of the following period 212 continues to time 218, and then stops.

D. Extended Time Recorder Display and Selection Options

FIG. 5 is an exemplary partial screen shot illustrating a hypothetical extended time recorder (ETR) notification message 502 that is displayed on presentation device 120 when a user operates the extended time recorder 100 to begin playback of the program of interest 202. The user may use the remote 128 (FIG. 1), or anther suitable controller, to initiate the process of retrieving and displaying the previously recorded program of interest 202.

As noted above, the previously recorded program of interest 202 may be stored in a variety of suitable media types, formats, and/or locations. It is to be appreciated that different processes of retrieving and presenting the recorded program of interest 202 may be used.

When the user initiates the process of retrieving and presenting the previously recorded program of interest 202, embodiments of the extended time recorder 100 generate an ETR notification message 502 (FIG. 5) that is presentable on presentation device 120. An ETR notification message 502 is then communicated to and displayed on presentation device 120 when the program of interest 202 is retrieved, or the process of retrieving is initiated. The ETR notification message 502 indicates the availability of the recorded advance period 204 and/or the recorded following period 212.

The non-limiting exemplary ETR notification message 502 includes a first portion 504 which indicates to the user the availability of the advance period 204, program of interest 202, and/or following period 212. The ETR notification message 502, portion 504 is illustrated as a three-line text message that indicates that the advance period 204 and following period 212 are available for viewing in addition to the recorded program of interest 202. Portion 504 may be presented in any suitable form, such as alpha-numeric text and/or symbols such as icons. The portion 504 may be arranged in any format, and may include more or less information than is illustrated in FIG. 5.

The non-limiting exemplary ETR notification message 502 may include a second portion 506 that corresponds to the selectable regions 508, 510, 512 associated with the advance period 204, program of interest 202, and/or following period 212, respectively. The selectable regions 508, 510, and/or 512 indicate to the user the selectability of one or all of the advance period 204, program of interest 202, and/or following period 212. Here, for convenience of describing the ETR notification message 502, portion 506 is illustrated as three selectable boxes which the user may select. In some embodiments, the user may select the order in which the advance period 204, program of interest 202, and following period 212 are displayed. Also, the user may select only the ones of the advance period 204, program of interest 202, and/or following period 212 that the user is interested in.

In this simplified exemplary embodiment, selectable region 508 is appreciated to be associated with the advance period 204. Accordingly, selection of the selectable region 508 will select the advance period 204 for presentation. Similarly, selectable region 510 is understood to be associated with the program of interest 202, and selectable region 512 is understood to be associated with the following period 212. Selection of the selectable region 510 and/or 512 will select the program of interest 202 and the following period 212, respectively, for presentation.

As noted above, a user may choose which of the advance period 204, program of interest 202, and following period 212 are selected for presentation. For example, if the user selects regions 508 and 510, the previously recorded advance period 204 and the program of interest 202 will be retrieved and presented on presentation device 120. If the user only selects region 510, only the previously recorded program of interest 202 will be retrieved and presented on presentation device 120. On the other hand, if the user only selects region 508, only the previously recorded advance period 204 will be retrieved and presented on presentation device 120.

In some embodiments, upon completion of the presentation of the selected advance period 204, program of interest 202, and/or following period 212, the ETR notification message 502 may again be displayed. The user may exit the ETR notification message 502 by selecting the selectable region 514, or select one or more of the advance period 204, program of interest 202, and/or following period 212 for presentation. In other embodiments, after play back of the selected recordings, the ETR notification message 502 is not again displayed, and operation of the presentation device 120 is returned to some alternative operating condition.

The selectable regions 508, 510, 512, and/or 514 may be presented in any suitable form, such as a symbol, icon, or the like. The selectable regions 508, 510, 512, and/or 514 may be arranged in any format and/or location on the display, and may further include more or less information than is illustrated in FIG. 5. Selection of a selectable region 508, 510, 512, and/or 514 may be indicated with highlighting or another suitable secondary symbol, such as an "x" or check mark, or even a number or letter to indicate order of play back. It is to be appreciated that the user understands that the selectable regions 508, 510, and/or 512 are associated with a respective recording by proximity of the selectable region to its respective descriptor in portion 504.

As noted above, recording of the advance period 204 begins at time 206 and ends at time 210 (FIG. 2). Recording of the following period 204 begins at time 216 and ends at time 218. In some embodiments, times 206, 210, 216, and/or 218 may be specified by the user. Accordingly, a suitable messaging or menu system would be provided so that the user may specify times 206, 210, 216, and/or 218. For example, the selectable regions 508, 510, and/or 512 may be operable to receive time specification from the user.

ETR notification messages 502 may be predefined and stored in the ETR notification messages portion 312 of memory 308 (FIG. 3). However, they may be generated as needed by the extended time recorder 100. Any suitable type of ETR notification message 502 may be used by embodiments of the extended time recorder 100.

E. Identification of Programs of Interest

As noted above, embodiments of the extended time recorder 100 are operable to record the advance period 204, program of interest 202, and/or following period 212 based upon a characteristic of the program of interest 202. Accordingly, a program selected for recording may be characterized or classified as a program of interest 202 based upon a matching, correlation, or the like, of the program's characteristics with at least one or more characteristics which are associated with a program of interest 202.

The extended time recorder 100 may identify programs of interest 202 based upon pre-characterization or pre-classification of the program selected for recording. EPGs may have sub-menus or the like (not shown) which have pre-characterized or pre-classified the available programming into program types according to a characteristic, such as movies, sporting events, news, etc. Upon selection of a program type by the user, programs characterized or classified into the selected program type are displayed on an EPG sub-menu. Thus, if a user is interested only in viewing sport programs, selection of sports programming from an EPG sub-menu causes the display of the available sports programming. Accordingly, some other device or system may have pre-characterized or pre-classified the available programming into different types or categories based upon program characteristics. This information, which may be embedded into the program as data, may be used to characterize or classify the program selected for recording as a program of interest 202.

In response to a user's selection of a program for recording, embodiments compare and/or correlate the ETR program characteristics 314 (FIG. 3) with the above-described program classifications. If a match and/or correlation between the ETR program characteristics 314 and at least one characteristic of the program selected for recording, the selected program is identified as a program of interest 202 for which the advance period 204 and the following period 212 are to be recorded. Embodiments may use a plurality of matches and/or correlations between the ETR program characteristics 314 and characteristics of the program selected for recording, which may facilitate a more reliable identification of a selected program as a program of interest 202.

For example, sporting events may be included as a characteristic in the ETR program characteristics 314. Assume that the user selects a program of interest 202 entitled "Wednesday Evening Football" for recording during the upcoming scheduled Wednesday evening broadcast. Since at least one characteristic of selected program is a sporting event, its characteristic corresponds to and/or matches the ETR program characteristic. Thus, embodiments of the extended time recorder 100 record and store at least the advance period 204 and the following period 212. Some embodiments may also record the program of interest 202, here, the broadcast of "Wednesday Evening Football".

Some embodiments may dynamically identify programs selected for recording based upon one or more keywords associated with the program. For example, a keyword term or phrase associated with a program selected for recording may be used to identify the selected program as a program of interest 202 for which the advance period 204 and the following period 212 are to be recorded.

Embodiments may be operable to learn programming content characteristics based upon a previous presentation history. For example, keywords and/or classifications may be associated with a program that the user selects for recording the advance period 204 and/or the following period 212. The next time the same program, or a similar program with the keywords and/or classifications is recorded, the extended time recorder 100 records the advance period 204 and/or the following period 212.

Information associated with the selected program for recording may be available and embedded into the program as data. As one non-limiting example, the information may specify that the program is a program of interest 202. The information may include terms or phrases that may be parsed into keyword terms or phrases. Accordingly, embodiments of the extended time recorder 100 may access the information, and then compare or correlate the information with keyword terms and/or phrases known to be associated with the types of programs of interest 202 for which the advance period 204 and the following period 212 are to be recorded. That is, a keyword search may be performed by embodiments of the extended time recorder 100 to identify a program selected for recording as being a program of interest 202.

Embodiments may identify a program selected for recording as a program of interest 202 based upon an indicia, such as a tag or other suitable identifier (ID), associated with the selected program. For example, a tag or ID may be pre-associated with the selected program by a third party, such as, but not limited to, the program provider, originator, distributor, and/or user. The tag or ID may be added into information, such as metadata or program descriptor information, that is embedded into or communicated with the selected program. Upon detection of a received tag or ID by the extended time recorder 100, the program selected for recording is identified as a program of interest 202. Such key words, tags, or the like, that designate programming content as a program of interest 202 can thus be provided by the program originator, networks, program providers, program distributor, user, or combinations thereof.

It is to be appreciated that any suitable type of characteristic, or other suitable criteria, may be used to identify a program selected for recording as a program of interest 202. That is, any suitable characteristic or criteria may be used to identify or classify a program selected for recording as a program of interest 202 for which the advance period 204 and/or the following period 212 are to be recorded. As noted above, the characteristics stored in the ETR program characteristics 314 region of memory 308 may be stored as a database, lookup table or the like, collectively referred to as a database for convenience. The characteristics may be stored in other convenient locations, such as a remote memory system or media.

For convenience, sporting event type programs were used as an exemplary characteristic to describe the operation of various embodiments of the extended time recorder 100. It is to be appreciated that the characteristics are not limited to sporting events.

F. Other Extended Time Recorder Embodiments

Figure 6:
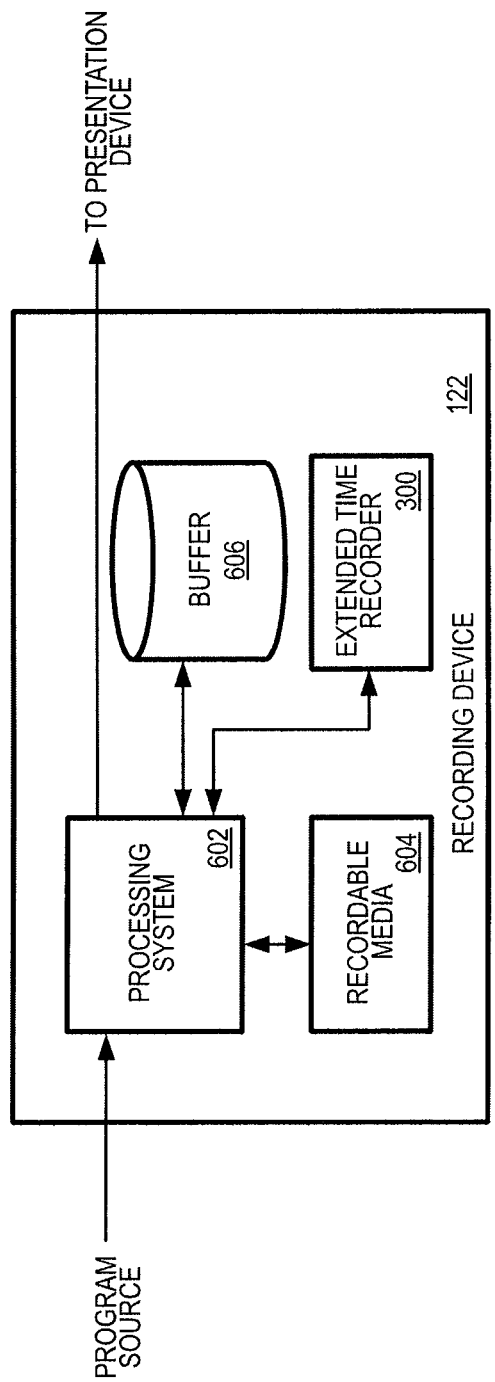

FIG. 6 is a block diagram of an extended time recorder 100 embodiment implemented in a recording device 122 that employs a removable recordable media 604. The simplified exemplary recording device 122 comprises a processing system 602 operable to receive programs from a suitable source, and operable to communicate a recorded program of interest 202 to presentation device 120. Recording device 122 includes a processing system 602 operable to record programming onto the removable recordable media 604, and may include an optional buffer 606.

Once a program selected for recording is identified as a program of interest 202 for which the advance period 204 and the following period 212 are to be recorded, the advance period 204, program of interest 202, and/or following period 212 may be recorded or stored onto at least one of the removable recordable media 604 or the optional buffer 606. Examples of a removable recordable media 604 include: magnetic tape media, such as video cassette recorder (VCR) media or the like; optical based recording media, such as digital video discs (DVD) or the like; electronic based recording media, such as a smart card or the like; or other suitable portable media.

In some embodiments, the advance period 204 and/or the following period 212 may be stored into the optional buffer 606 for temporary storage. Thus, the advance period 204 and/or the following period 212 may not be initially recorded onto the removable recordable media 604 to save data storage capacity of the removable recordable media 604.

A user may then have the option of selectively saving the advance period 204 and/or the following period 212 onto the removable recordable media 604 at a later time. The advance period 204 and/or the following period 212 could be retrieved from the optional buffer 606 in the recording device 122, the buffer 306 in the receiving device 118, or any other media in which the advance period 204 and/or the following period 212 have been stored.

Some embodiments of the receiving device 118 may have a removable recordable media 604 integrated therein. Thus, such receiving devices 118 would operate similar to the above-described recording device 122.

The extended time recorder 100 is illustrated as a separate module/component/system residing in the recording device 122. The extended time recorder 100 may be integrated into the processing system 602 or other components or systems of the receiving device 118.

The above-described buffer 306 and memory 308 (FIG. 3) may be the same memory media or separate memory media. In the context of this disclosure, buffer 306, memory 308, and/or buffer 606 (FIG. 6) are computer-readable medium that may be an electronic, magnetic, optical, or other another physical device or means that contains or stores a computer and/or processor program and/or information. In the context of this disclosure, a "computer-readable medium" can be any means that can store, communicate, propagate, or transport the program associated with ETR logic 310 and/or recorded programming for use by or in connection with the instruction execution system, apparatus, and/or device. The computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with ETR logic 310 is printed, as the program can be electronically captured, via, for instance, optical scanning of the paper or other medium, then compiled, interpreted, or otherwise processed in a suitable manner, if necessary, and then stored in buffer 306, memory 308, and/or buffer 606.

The above-described video processing system 304 (FIG. 3) and the processing system 602 (FIG. 6) include a suitable processor device or system. Any suitable processor device or system may be employed in various embodiments of a extended time recorder 100. The processor device or system may be a specially designed and/or fabricated processing system, or a commercially available processor system. Non-limiting examples of commercially available processor systems include, but are not limited to, an 80x86 or Pentium series microprocessor from Intel Corporation, U.S.A., a PowerPC microprocessor from IBM., a SPARC microprocessor from Sun Microsystems, Inc., a PA-RISC series microprocessor from Hewlett-Packard Company, or a 68xxx series microprocessor from Motorola Corporation.

In the above-described embodiments, a program selected for recording was identified as a program of interest 202 based upon at least one characteristic. In some embodiments, a user may elect to categorize a program as a program of interest 202. Accordingly, the ETR notification message 502 may include a selectable region so that the user may specify that the advance period 204 and/or the following period 212 are recorded along with the program of interest 202. Some embodiments may be operable to receive specified characteristics from the user.

In some embodiments, when a program selected for recording is not identified as being a program of interest 202, the selected program is recorded in any suitable manner. Accordingly, the advance period 204 and the following period 212 are not recorded. However, some embodiments may record the advance period 204 and/or the following period 212 for all selected recorded programs, even if there is no identification of a selected program as a program of interest 202. The recorded advance period 204 and following period 212 may be saved on a re-recordable memory medium. Upon retrieval of the recorded program for presentation, the ETR notification message 502 may be presented. Thus, the user may elect to have the advance period 204 and/or following period 212 presented.

Some embodiments of the extended time recorder 100 (FIG. 3) are operable to adjust the period of time for the advance period 204 and/or the following period 212 based upon a characteristic of the program of interest 202 (FIG. 2). For example, in one instance the program of interest 202 may be a regularly-scheduled sporting event, and accordingly, the periods of time for the advance period 204 and/or the following period 212 may be predefined. However, if the program of interest 202 is a championship sporting event, as indicted by one or more characteristics of the program of interest 202, the periods of time for the advance period 204 and/or the following period 212 may be increased. In other situations, the periods of time for the advance period 204 and/or the following period 212 may be decreased. That is, the embodiment is dynamically making an intelligent decision regarding the periods of time for the advance period 204 and/or the following period 212.

Some embodiments may display the ETR notification message 502 with a selectable region which allows the user to adjust the periods of time for the advance period 204 and/or the following period 212. The user may be able to select from predefined periods of time, or may be able to specify periods of time, and/or specify the above-described times 206, 210, 216, and/or 218, for the advance period 204 and/or the following period 212.

Some embodiments are operable to assess availability of memory capacity before recording the advance period and/or following period. When memory capacity in excess of the amount required to save the program of interest is available, the advance period and/or following periods are recorded. If there is not sufficient available memory capacity to record the advance period and/or following period, then recording may be made up to the amount of available memory capacity. Some embodiments may automatically record the advance period first, followed by the following period. Some embodiments may automatically record the following period first, followed by the advance period. Other embodiments may determine which of the advance period and/or following period to record based upon the determined characteristic. For example, if the determined characteristic is a sporting event of the type which may run late due to overtime rules, the following period receives priority over the advance period.

Some embodiments, if there is not sufficient available memory capacity to record the advance period and/or following period, may prompt the user to make a selection to record either the advance period and/or following period. Other embodiments may erase and/or record over older programming to make room for the advance period and/or following period. In some embodiments, older programming may be identified by a threshold or the like. Another embodiment may erase and/or record over the oldest recorded program. Further, unused and available memory capacity may be initially utilized for the advance period and/or following period, and when no more unrecorded capacity is available, the older programming may be erased and/or recorded over as necessary.

Figure 7:
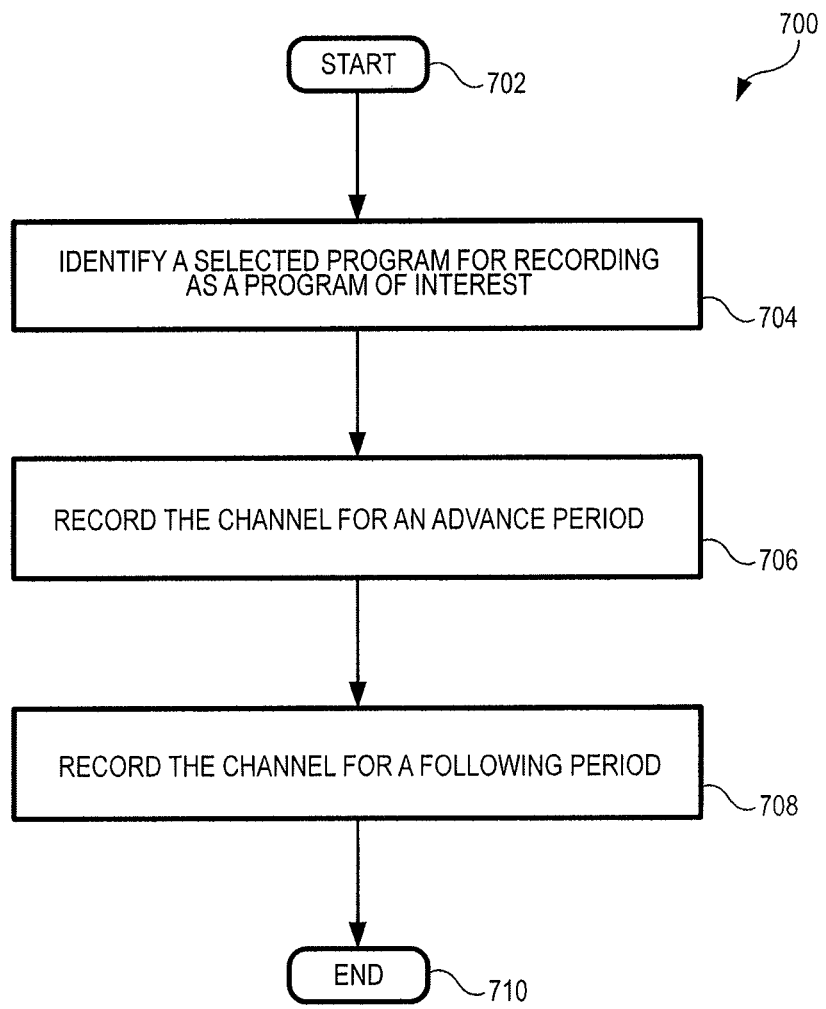
FIGS. 7 and 8 are flowcharts illustrating a-processes used by an exemplary embodiment of the extended time recorder.
Figure 8:
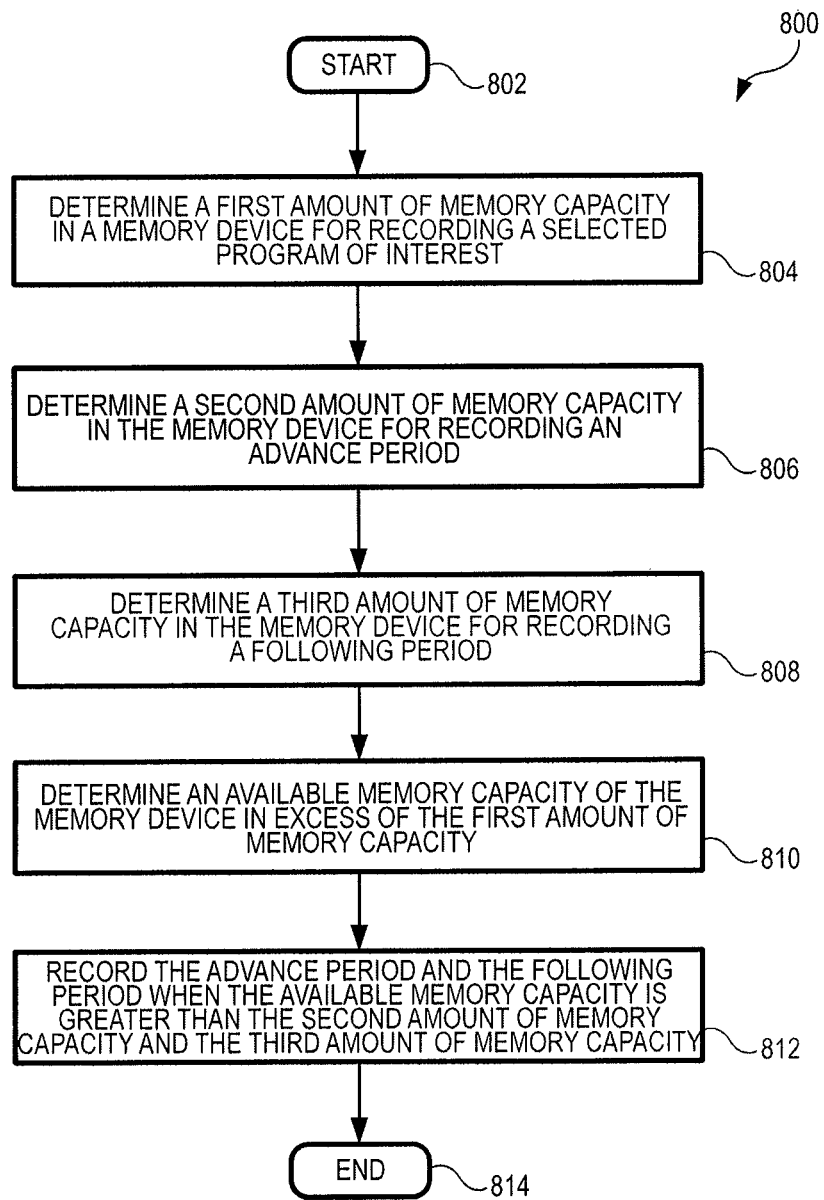

FIGS. 7 and 8 are flowcharts 700 and 800, respectively, illustrating processes used by an embodiment of the extended time recorder 100. The flow charts 700 and 800 show the architecture, functionality, and operation of a possible implementation of the software for implementing the ETR logic 310 (FIG. 3). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 7, the process 700 starts at 702, for example, in response to receiving a selection of a program for recording by a user. At 704, the selected program for recording is identified as a program of interest based upon a characteristic of the selected program, the characteristic of the selected program corresponding to at least one characteristic associated with the program of interest. In some embodiments, the characteristic of the selected program corresponding to at least one characteristic associated with the program of interest 202. At 706, the advance period 204 corresponding to a period before a beginning of the program of interest is recorded. In some embodiments, the advance period 204 substantially corresponding to a period before a beginning of the program of interest. At 708, the following period 212 corresponding to a period after a conclusion of the program of interest is recorded. In some embodiments, the following period 212 substantially corresponding to a period after a conclusion of the program of interest 202. The process ends at 710.

With respect to FIG. 8, the process 800 starts at 802, for example, in response to receiving a selection of a program for recording by a user. At 804, a first amount of memory capacity in a memory device for recording a selected program of interest is determined. At 806, a second amount of memory capacity in the memory device for recording an advance period is determined. At 808, a third amount of memory capacity in the memory device for recording a following period is determined. At 810, an available memory capacity of the memory device in excess of the first amount of memory capacity for recording the program of interest is determined. At 812, the advance period and the following period are recorded when the available memory capacity is greater than the second amount of memory capacity and the third amount of memory capacity. The process ends at 814.

While various embodiments have been described hereinabove, it is to be appreciated that various changes in form and detail may be made without departing from the spirit and scope of the invention(s) presently or hereafter claimed.

The invention claimed is:

1. A method for recording programs, comprising:
   identifying a program selected for recording as a program of interest based upon the program selected for recording having at least one characteristic corresponding to at least one characteristic of a previous program for which at least one of an advance period associated with the previous program or a following period associated with the previous program was recorded;
   recording an advance period associated with the program of interest, the advance period corresponding to a period before a beginning of the program of interest; and
   recording a following period associated with the program of interest, the following period corresponding to a period after a conclusion of the program of interest;
   receiving an indication from a user to initiate a process of retrieving and presenting the program of interest;
   in response to the receiving the indication from the user to initiate a process of retrieving and presenting the program of interest, before any presentation of the program of interest, enabling the user to choose which of the recorded advance period, the program of interest, and the recorded following period are selected for presentation;
   if the user chooses only the recorded advance period, retrieving and presenting only the recorded advance period and neither the program of interest nor the recorded following period in response to the user choosing only the recorded advance period;
   if the user chooses only the program of interest, retrieving and presenting only the program of interest and neither the recorded advance period nor the recorded following period in response to the user choosing only the program of interest;
   receiving a selection from the user for presentation of the recorded advance period, the program of interest, or the recorded following period;
   in response to the receiving the selection from the user for presentation of the recorded advance period, the program of interest, or the recorded following period, retrieving and causing a presentation of the recorded advance period, the program of interest, or the recorded following period according to the received selection; and
   in response to a completion of the presentation of the recorded advance period, the program of interest, or the recorded following period according to the received selection, generating an extended time recording (ETR) notification message, wherein the ETR notification message is presentable on a presentation device upon the completion of the presentation of the recorded advance period, the program of interest, or the recorded following period, and wherein the ETR notification message indicates availability of selection of the recorded advance period, the program of interest, or the recorded following period for presentation.

2. The method of claim 1, wherein recording the advance period comprises:
   starting recording of the advance period associated with the program of interest at a first time that precedes a scheduled start time of the program of interest; and
   ending recording of the advance period associated with the program of interest at a second time that corresponds to the scheduled start time of the program of interest.

3. The method of claim 1 wherein recording the following period comprises:
   starting recording of the following period associated with the program of interest at a first time that corresponds to the scheduled end time of the program of interest; and
   ending recording of the following period associated with the program of interest at a second time that is after the scheduled end time of the program of interest.

4. The method of claim 1, comprising:
   recording the program of interest starting at the scheduled start time and ending at a scheduled end time.

5. The method of claim 1, comprising:
   storing the recorded advance period associated with the program of interest into a first portion of a memory;
   storing the program of interest into a second portion of the memory; and
   storing the recorded following period associated with the program of interest into a third portion of the memory.

6. The method of claim 1, comprising:
   storing the recorded advance period associated with the program of interest into a first portion of a first memory; and
   storing the recorded following period associated with the program of interest into a second portion of the first memory, wherein the program of interest is stored into a second memory.

7. The method of claim 1, comprising:
   adjusting the advance period associated with the program of interest based upon another characteristic of the program.

8. The method of claim 1, comprising:
   adjusting the following period associated with the program of interest based upon another characteristic of the program.

9. The method of claim 1 wherein identifying the selected program for recording as a program of interest comprises:
receiving electronic descriptor information associated with the selected program;
comparing the received electronic descriptor information with characteristics associated with the previous program for which at least one of the advance period associated with the previous program or the following period associated with the previous program was recorded; and
identifying the selected program as the program of interest in response to a match of the electronic descriptor information with the at least one characteristic of the previous program.

10. The method of claim 1 wherein identifying the selected program for recording as a program of interest comprises:
receiving electronically, a user specification that the selected program is the program of interest.

11. The method of claim 1, wherein the enabling the user to choose which of the recorded advance period, the program of interest, and the recorded following period are selected for presentation includes:
in response to the receiving the indication from the user to initiate a process of retrieving and presenting the program of interest, before any presentation of the program of interest, communicating a notification message on a presentation device, the notification message including first selectable region which indicates to the user selectability of the recorded advance period associated with the program of interest, a second selectable region which indicates to the user selectability of the program of interest and a third selectable region which indicates to the user selectability of recorded following period associated with the program of interest; and
receiving an indication from the user of the which of the recorded advance period, the program of interest and the recorded following period are selected for presentation according to a received indication of a corresponding selection by the user of one or more of the first selectable region, second selectable region and the third selectable region.

12. The method of claim 11, further comprising:
receiving a selection from the user of the first selectable region and not the second or third selectable region; and
in response to receiving the selection from the user of the first selectable region, but not the second or third selectable region, retrieving and presenting on the presentation device the recorded advance period and not the program of interest or recorded following period.

13. The method of claim 11, further comprising:
receiving a selection from the user of the second selectable region and not the first or third selectable region; and
in response to receiving the selection from the user of the second selectable region, but not the first or third selectable region, retrieving and presenting on the presentation device the program of interest, but not the recorded advance period or recorded following period.

14. The method of claim 1, further comprising:
receiving a selection from the user of an order in which the recorded advance period, program of interest, and recorded following period are to be played back; and
in response to receiving the selection from the user of the order in which the recorded advance period, program of interest, and recorded following period are to be played back, playing back the recorded advance period, program of interest, and recorded following period according to the selection from the user of the order in which the recorded advance period, program of interest, and recorded following period are to be played back.

15. The method of claim 1, further comprising:
if the user chooses only the recorded following period in response to the enabling the user to choose which of the recorded advance period, the program of interest, and the recorded following period are selected for presentation, then retrieving and presenting, before any presentation of the program of interest, only the recorded following period and neither the program of interest nor the recorded advance period in response to the user choosing only the recorded following period.

16. A system which records a program, comprising:
a receiving device operable to receive a program selected for recording; and
a processor operable to compare at least one characteristic of the program selected for recording with a plurality of program characteristics, and in response to the at least one characteristic of the program selected for recording matching one of the plurality of program characteristics, and in response to the program selected for recording having at least one characteristic corresponding to at least one characteristic of a previous program for which at least one of an advance period associated with the previous program or a following period associated with the previous program was recorded, is operable to:
identify the program selected for recording as a program of interest;
control recording of at least an advance period associated with the program of interest that precedes a scheduled start time of the program of interest; and
record a following period associated with the program of interest that follows a scheduled end time of the program of interest;
receive an indication from a user to initiate a process of retrieving and presenting the program of interest;
in response to the received indication from the user to initiate a process of retrieving and presenting the program of interest, before any presentation of the program of interest, enable the user to choose which of the recorded advance period, the program of interest, and the recorded following period are selected for presentation;
if the user chooses only the recorded advance period, retrieve and present only the recorded advance period and neither the program of interest nor the recorded following period in response to the user choosing only the recorded advance period;
if the user chooses only the program of interest, retrieve and present only the program of interest and neither the recorded advance period nor the recorded following period in response to the user choosing only the program of interest;
receive a selection from the user for presentation of the recorded advance period, the program of interest, or the recorded following period;
in response to the receiving the selection from the user for presentation of the recorded advance period, the program of interest, or the recorded following period, retrieve and cause a presentation of the recorded advance period, the program of interest, or the recorded following period according to the received selection; and in response to a completion of the presentation of the recorded advance period, the program of interest, or the recorded following period according to the received selection, generate an extended time recording (ETR) notification message, wherein the ETR notification message is presentable on a presentation device upon the completion of the presentation of the recorded advance period, the program of interest, or the recorded following period, and wherein the ETR notification message indicates availability of selection of the recorded advance period, the program of interest, or the recorded following period for presentation.

17. The system of claim 16 wherein the memory has a database populated with the database characteristics associated with the program of interest.

18. The system of claim 16, comprising:
a first tuner operable to tune to a first channel having the program of interest so that the advance period associated with the program of interest and the following period associated with the program of interest are recorded.

19. The system of claim 16, comprising:
a memory populated with the extended time recording (ETR) notification message, wherein the ETR notification message is displayed on a display device when the recorded program of interest is retrieved for play back, and wherein the ETR notification message indicates the advance period associated with the program of interest and the following period associated with the program of interest are available for play back.

20. The system of claim 16, comprising:
a memory operable to store the recorded advance period associated with the program of interest and the recorded following period associated with the program of interest.

21. The system of claim 16, comprising:
an external recording device coupled to the receiving device and operable to store the recorded advance period associated with the program of interest and the recorded following period associated with the program of interest.

22. The system of claim 16, comprising:
an external recording device coupled to the receiving device and operable to store the recorded advance period associated with the program of interest, the recorded program of interest and the recorded following period associated with the program of interest.

23. The system of claim 16, comprising:
a recording device residing in the receiving device and operable to store the recorded advance period associated with the program of interest and the recorded following period associated with the program of interest.

24. The system of claim 16, comprising:
a recording device residing in the receiving device and operable to store the recorded advance period associated with the program of interest, the recorded program of interest and the recorded following period associated with the program of interest.

25. A method for recording programs, comprising:
identifying a program selected for recording as a program of interest based upon the program selected for recording having at least one characteristic corresponding to at least one characteristic of a previous program for which at least one of an advance period associated with the previous program or a following period associated with the previous program was recorded;
determining a first amount of memory capacity in a memory device for recording the program of interest;
determining a second amount of memory capacity in the memory device for recording an advance period associated with the program of interest and corresponding to a period before a beginning of the program of interest;
determining a third amount of memory capacity in the memory device for recording a following period associated with the program of interest corresponding to a period after a conclusion of the program of interest;
determining an available memory capacity of the memory device in excess of the first amount of memory capacity for recording the program of interest; and
recording the advance period associated with the program of interest and the following period associated with the program of interest when the available memory capacity is greater than the second amount of memory capacity and the third amount of memory capacity;
receiving an indication from a user to initiate a process of retrieving and presenting the program of interest;
in response to the receiving the indication from the user to initiate a process of retrieving and presenting the program of interest, before any presentation of the program of interest, enabling the user to choose which of the recorded advance period, the program of interest, and the recorded following period are selected for presentation;
if the user chooses only the recorded advance period, retrieving and presenting only the recorded advance period and neither the program of interest nor the recorded following period in response to the user choosing only the recorded advance period;
if the user chooses only the program of interest, retrieving and presenting only the program of interest and neither the recorded advance period nor the recorded following period in response to the user choosing only the program of interest;
receiving a selection from the user for presentation of the recorded advance period, the program of interest, or the recorded following period;
in response to the receiving the selection from the user for presentation of the recorded advance period, the program of interest, or the recorded following period, retrieving and causing a presentation of the recorded advance period, the program of interest, or the recorded following period according to the received selection; and
in response to a completion of the presentation of the recorded advance period, the program of interest, or the recorded following period according to the received selection, generating an extended time recording (ETR) notification message, wherein the ETR notification message is presentable on a presentation device upon the completion of the presentation of the recorded advance period, the program of interest, or the recorded following period, and wherein the ETR notification message indicates availability of selection of the recorded advance period, the program of interest, or the recorded following period for presentation.

26. The method of claim 25 comprising:
in response to the available memory capacity being less than the second amount of memory capacity and the third amount of memory capacity, recording the advance period associated with the program of interest and the following period associated with the program of interest until the available memory capacity is utilized.

27. The method of claim 25 comprising:

in response to the available memory capacity being less than the second amount of memory capacity and the third amount of memory capacity, adjusting at least one of the advance period associated with the program of interest and the following period associated with the program of interest so that the second memory capacity and the third memory capacity are at least less than the determined available memory capacity.

28. The method of claim 25 wherein determining an available memory capacity in excess of the first amount of memory capacity comprises:

identifying unrecorded memory capacity in the memory such that the available memory capacity includes the unrecorded memory capacity.

29. The method of claim 25 wherein determining an available memory capacity in excess of the first amount of memory capacity comprises:

identifying recorded memory capacity in the memory associated with programming recorded earlier than a time threshold, such that the available memory capacity includes the recorded memory capacity associated with programming recorded earlier than a time threshold.

30. The method of claim 25 wherein determining an available memory capacity in excess of the first amount of memory capacity comprises:

identifying unrecorded memory capacity in the memory;

identifying recorded memory capacity in the memory associated with programming recorded earlier than a time threshold; and recording the advance period and the following period into the unrecorded memory capacity until the unrecorded memory capacity is utilized, and then recording the remainder of the advance period and the following period into the recorded memory capacity.

* * * * *